Patented Apr. 18, 1950

2,504,696

UNITED STATES PATENT OFFICE 2,504,696

PRODUCTION OF BERYLLIUM OXIDE

Henry C. Kawecki, Fleetwood, Pa., assignor to The Beryllium Corporation, Reading, Pa., a corporation of Delaware No Drawing. Application October 2, 1948, Serial No. 52,593

5 Claims. (Cl. 23—140)

This invention relates to the production of beryllium oxide and, more particularly, to the production of beryllium oxide of high purity.

The production of beryllium compounds of high purity, either as the ultimate goal in the case of a specific need for the compound or as a necessary prerequisite to the production of beryllium metal of high purity, is complicated by the chemical similarity between beryllium and the aluminum which is normally associated therewith in the more abundant beryllium ores. Moreover, the pronounced tendency of many beryllium compounds to absorb as impurities the reagents used, or the by-products formed, in the course of producing such beryllium compounds introduces further obstacles in the quest for chemically pure beryllium compounds and beryllium metal.

The problem of recovering beryllium from its ore without contamination with aluminum has been successfully solved by the process described and claimed in the copending application of Gordon F. Simons and myself, Serial No. 44,997, filed August 18, 1948. The process of said application provides for the recovery of the beryllium content of its ore in the form of chemically pure ammonium beryllium fluoride. This latter product is particularly adapted to conversion to beryllium metal of high purity by means of electrolysis. The conversion of pure ammonium beryllium fluoride to high purity beryllium oxide, for which there is an important demand, has presented another problem. It would appear to be a simple matter to precipitate beryllium hydroxide from an aqueous solution of the ammonium beryllium fluoride and then calcine the hydroxide to produce beryllium oxide. Although sodium or potassium hydroxide will readily effect such precipitation of beryllium hydroxide, the impurities present in commercially available alkali metal hydroxides tend to accumulate in the precipitated beryllium hydroxide. A further impurity in the beryllium hydroxide is occasioned by the tendency of the precipitated hydroxide to adsorb some of the alkali used as the precipitant. The introduction of these impurities can be avoided by the use of ammonia as the precipitant, but the reaction does not proceed to a commercially acceptable extent unless the ammonium beryllium fluoride solution is diluted to a formidable extent and unless a huge stoichiometric excess of ammonia is used. In any process wherein the beryllium is transformed to the hydroxide and is subsequently calcined, large volumes of liquids or gases, or both, must be handled, and a large amount of equipment is needed in the form of tanks, filters and furnaces.

I have now devised a method of converting ammonium beryllium fluoride to beryllium oxide of high purity which is free of the objectionable features mentioned hereinbefore and which may be carried out in a single piece of equipment. The method of my invention comprises reacting ammonium sulfate with the ammonium beryllium fluoride by heating a mixture thereof to a temperature of about 500° C. with the resulting production of beryllium sulfate and evolution of ammonium fluoride, and then heating the beryllium sulfate to a temperature of at least about 750° C. whereby it is decomposed to beryllium oxide of high purity.

The ammonium beryllium fluoride from which the beryllium oxide is produced in accordance with my invention may be obtained readily from beryllium ore by the method of the aforementioned application. That method comprises heating beryllium ore with a double fluoride of an alkali metal and iron or silicon to a temperature sufficiently high to effect decomposition of the ore with the resulting production of sodium beryllium fluoride, disintegrating the resulting product in the presence of added water, adding ammonium fluosilicate to the disintegrated product, and separating therefrom the resulting aqueous phase comprising a solution of ammonium beryllium fluoride. The method is applicable to the treatment of any beryllium ore such as beryl or helvite. The double fluoride of the alkali metal and iron or silicon may be sodium ferric fluoride ($Na_3FeF_6$) or sodium fluosilicate ($Na_2SiF_6$), or the corresponding potassium salts. The ammonium beryllium fluoride can be recovered from its solution by any appropriate means such as crystallization, the resulting crystals in either the moist or dry condition being particularly suitable for use in the conversion thereof to beryllium oxide in accordance with my present invention.

The ammonium beryllium fluoride produced as described hereinabove is free of aluminum, which usually contaminates other beryllium compounds produced from its ore. The small amounts of impurities in the form of soluble compounds of iron, manganese, copper and nickel, which may be present in the ammonium beryllium fluoride solution may be removed substantially completely by purification of the solution prior to the crystallization step. This purification is advantageously effected in two stages. In the first stage, ammonium sulfide is added to the ammonium beryllium fluoride solution along with enough ammonium hydroxide to bring its pH up to 5.5–6.0. Iron, copper and nickel are thus precipitated as sulfides and may be removed by filtration or decantation. Soluble manganese compounds remaining in the ammonium beryllium fluoride solution may be removed in a second purification stage by adding a stoichiometric amount of ammonium persulfate thereto, based upon the amount of manganese present, and by then heating the filtrate to about 100° C. After filtering off the resulting precipitated manganese dioxide and subsequently evaporating the filtrate, substantially pure crystals of ammonium beryllium fluoride are obtained.

The ammonium sulfate used as the other reagent in the method of my present invention may be obtained in commercial quantities in a very pure condition. No appreciable contamination of the ultimate beryllium oxide product is caused by the use of ammonium sulfate as the reactant for converting the ammonium beryllium fluoride to beryllium sulfate.

The reaction between ammonium beryllium fluoride and ammonium sulfate takes place readily when the two compounds are heated in admixture with one another. Both compounds are mixed in the substantially dry state, generally in the form of crystals of each compound. Moisture, such as that present in the crystals, does not interfere with the reaction but requires just that much more heat which must be supplied for evaporation of the moisture in the course of heating the mixture to the desired temperature. The ammonium sulfate is added to the ammonium beryllium fluoride in amount equal to, or slightly in excess of, the stoichiometric amount required in accordance with the reaction—

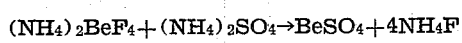
$(NH_4)_2BeF_4 + (NH_4)_2SO_4 \rightarrow BeSO_4 + 4NH_4F$

Adequate intimate contact between the two reactants is afforded by simple agitation or other mechanical mixing together of the crystals of the two compounds. The proximity of the two compounds thus effected is sufficient, upon subsequent heating, to initiate reaction therebetween. As the mass is heated, it is soon reduced to a pasty or fluid condition which insures final contact of sufficient intimacy to insure complete interreaction.

The reaction between ammonium beryllium fluoride and ammonium sulfate is endothermic and proceeds progressively as the mixture thereof is heated to a temperature of approximately 500° C. By the time the mass has reached a temperature of about 500° C., the ammonium beryllium fluoride and ammonium sulfate will generally have reacted completely with the evolution of ammonium fluoride and the production of a residue consisting of beryllium sulfate. If the reaction has not proceeded to completion by this time, the mass is maintained at a temperature of approximately 500° C. until the evolution of ammonium fluoride ceases. It is not advisable to heat the mixture substantially above 500° C. until reaction is complete because of the possibility of volatilizing and losing the reactants themselves. Furthermore, the ammonium fluoride evolved during reaction is substantially pure and may be recovered readily as a valuable byproduct. If the temperature of the reaction mass is raised so high as to initiate decomposition of the beryllium sulfate product, the ammonium fluoride vapors will be contaminated with oxides of sulfur liberated during such decomposition.

The beryllium sulfate product obtained by the reaction between the ammonium beryllium fluoride and ammonium sulfate is of high purity substantially uncontaminated by extraneous impurities or by other decomposition products of the reactants. The beryllium sulfate is then decomposed by further heating it to a temperature of at least 750° C., and preferably to a temperature of about 1000° C. The beryllium sulfate decomposes at a temperature of 750° C. or higher with the evolution of gaseous oxides of sulfur and the production of beryllium oxide substantially free of sulfur compounds or other impurities. The reaction appears to go to completion at any temperature of 750° C. or higher, the length of the reaction period decreasing with increasing temperatures. In general, the rate of heating the beryllium sulfate in a conventional furnace is such that the sulfate is substantially completely decomposed by the time the temperature of the mass has reached 800°–900° C.

The conversion of ammonium beryllium fluoride to beryllium oxide of high purity may be effected in a single furnace as noted hereinbefore. The ammonium fluoride vapors evolved in the first stage of the conversion may be recovered as such and the oxides of sulfur evolved in the second stage of the conversion may also be recovered if desired. The fact that the conversion is effected in two stages makes possible the separate recovery of the ammonium fluoride vapors and gaseous oxides of sulfur. The ammonium fluoride vapors evolved in the first stage of the conversion require the use of conventional equipment resistant to attack by such fluorides. If desired, the capacity of such equipment can be substantially doubled by effecting only the first stage of the conversion in such corrosion-resistant equipment and by transferring the beryllium sulfate thus produced to a second furnace or the like which need be resistant only to the less corrosive influence of the sulfur oxide gases.

It will be seen, accordingly, that the method of my invention offers a straightforward and mechanically simple procedure for the production of beryllium oxide of high purity. The beryllium oxide thus produced is substantially as pure as the ammonium beryllium fluoride starting material. The method, it will also be noted, does not involve the use of large volumes of aqueous solutions or the use of the extensive pumping, filtering and holding equipment usually associated therewith. The method of the invention can be carried out if desired in a single piece of equipment with a minimum of labor and attention.

I claim:

1. The method of producing beryllium oxide of high purity which comprises reacting ammonium sulfate with ammonium beryllium fluoride by heating a mixture thereof to a temperature of about 500° C. with the resulting production of beryllium sulfate and evolution of ammonium fluoride, and then heating the beryllium sulfate to a temperature of at least about 750° C. whereby it is decomposed to beryllium oxide of high purity.

2. The method of producing beryllium oxide of high purity which comprises reacting crystalline ammonium sulfate with crystalline ammonium beryllium fluoride by heating a mixture thereof to a temperature of about 500° C. with the resulting production of beryllium sulfate and evolution of ammonium fluoride, and then heating the beryllium sulfate to a temperature of at least about 750° C. whereby it is decomposed to beryllium oxide of high purity.

3. The method of producing beryllium oxide of high purity which comprises reacting ammonium sulfate with ammonium beryllium fluoride by heating a mixture thereof to a temperature of about 500° C. with the resulting production of beryllium sulfate and evolution of ammonium fluoride, and then heating the beryllium sulfate to a temperature of about 1000° C. whereby it is decomposed to beryllium oxide of high purity.

4. The method of producing beryllium oxide of high purity which comprises reacting ammonium sulfate with ammonium beryllium fluoride in a vessel resistant to attack by a fluoride by heating a mixture of said ammonium sulfate and ammonium beryllium fluoride to a temperature of about 500° C. with the resulting production of beryllium sulfate and evolution of ammonium fluoride, removing the beryllium sulfate from said vessel, and then heating the beryllium sulfate in another vessel resistant to attack by gaseous oxides of sulfur to a temperature of at least about 750° C. whereby the beryllium sulfate is decomposed to beryllium oxide of high purity.

5. The method of producing beryllium oxide of high purity which comprises heating beryllium ore with a double fluoride of an alkali metal and a metal of the group consisting of iron and silicon to a temperature sufficiently high to effect decomposition of the ore with the resulting production of sodium beryllium fluoride, disintegrating the sodium beryllium fluoride product in the presence of added water, adding ammonium fluosilicate to the resulting product, separating therefrom the aqueous phase comprising a solution of ammonium beryllium fluoride, recovering the ammonium beryllium fluoride by crystallization from said solution thereof, reacting ammonium sulfate with said ammonium beryllium fluoride by heating a mixture thereof to a temperature of about 500° C. with the resulting production of beryllium sulfate and evolution of ammonium fluoride, and then heating the beryllium sulfate to a temperature of at least about 750° C. whereby it is decomposed to beryllium oxide of high purity.

HENRY C. KAWECKI.

No references cited.